United States Patent [19]

Hold et al.

[11] 4,207,004
[45] Jun. 10, 1980

[54] SEALS FOR ROTARY PROCESSOR

[75] Inventors: Peter Hold, Milford, Conn.; Zehev Tadmor, Teaneck, N.J.

[73] Assignee: USM Corporation, Farmington, Conn.

[21] Appl. No.: 965,389

[22] Filed: Dec. 1, 1978

[51] Int. Cl.² .......................... B01F 7/10; B29B 1/06; B65D 53/06
[52] U.S. Cl. ..................................... 366/97; 366/307; 277/53; 277/135; 425/224; 425/466; 425/381.2
[58] Field of Search ..................... 366/52, 69, 97, 136, 366/262-265, 293, 315, 302-307, 336, 337, 340, 96-99; 264/85, 349, 176 C; 425/224, 374, 466, 86, 376, 207, 378, 381.2; 415/90, 101, 170 R, 170 B; 72/60, 262, 270; 277/15, 53, 135

[56] References Cited
PUBLICATIONS

Advances in Dynamic Seal Technology-by Otto Decker; Published by A.S.M.E.; 3-29-1967.

Primary Examiner—Harvey C. Hornsby
Assistant Examiner—Timothy F. Simone
Attorney, Agent, or Firm—John P. Morley; Richard B. Megley; Vincent A. White

[57] ABSTRACT

Sealing means for controlling leakage of material between closely spaced apart, relatively moving coaxial annular surfaces. Essentially, leakage is controlled by providing a pumping channel on one of the surfaces and a leakage liquid retaining channel on the other surface. The pumping and leakage liquid retaining channels are cooperatively arranged to resist flow of leakage liquid between the surfaces. The sealing means are particularly adaptable for controlling leakage from processing passages of rotary processing apparatus.

15 Claims, 16 Drawing Figures

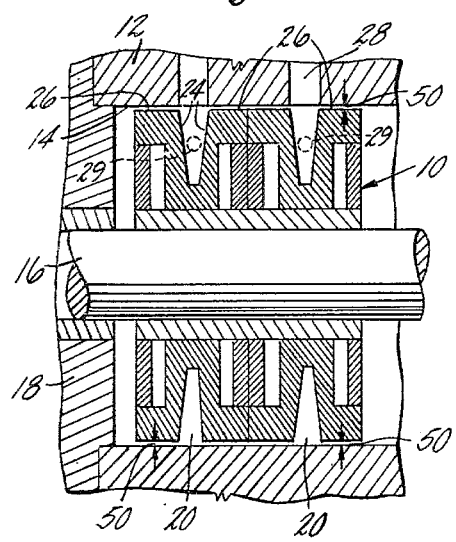
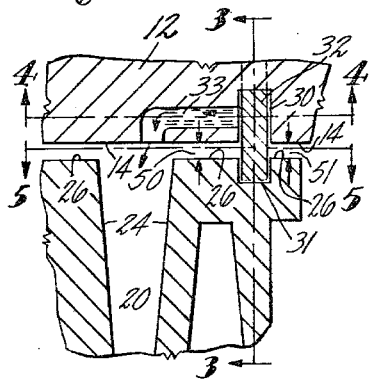
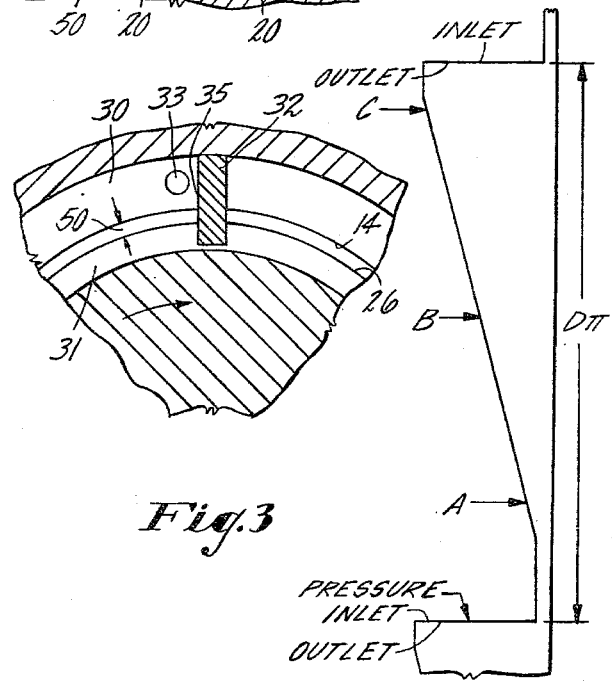
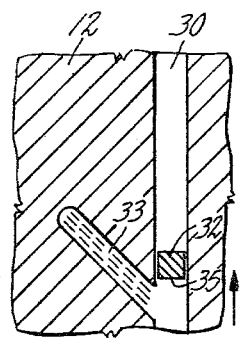
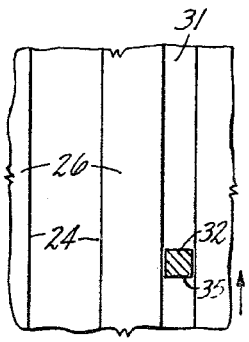

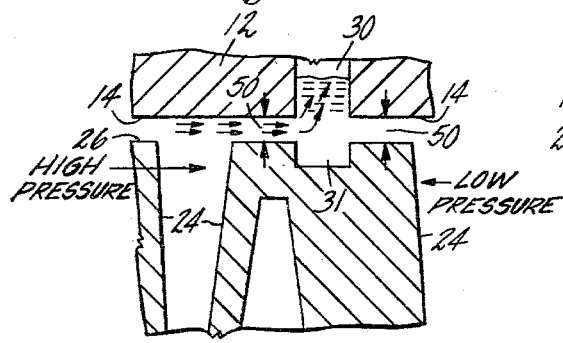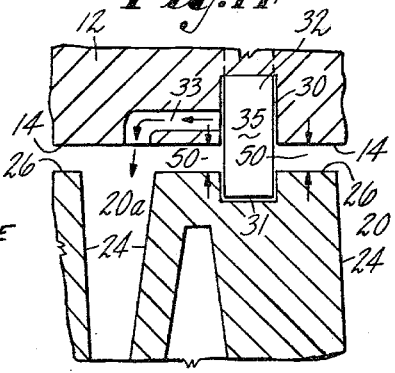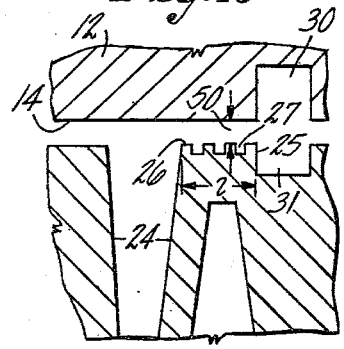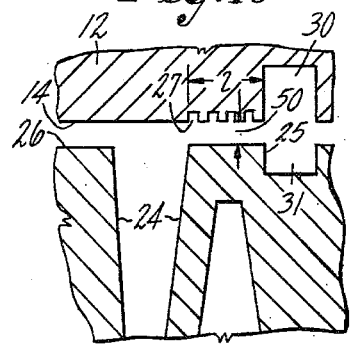

SEALS FOR ROTARY PROCESSOR

THE FIELD OF THE INVENTION

This invention relates to novel, improved sealing means for rotary processors particularly those for processing viscous or particulate plastic or polymeric materials.

DESCRIPTION OF THE PRIOR ART

Copending U.S. patent application Ser. No. 795,211 (now U.S. Pat. No. 4,142,805) filed May 11, 1977 as a continuation-in-part of U.S. application Ser. No. 654,040 filed Feb. 2, 1976 (now abandoned) and copending U.S. patent application Ser. No. 898,178 filed Apr. 20, 1978 by Zehev Tadmor—one of the inventors of this application—disclose processes and apparatus for processing plastic or polymeric materials. Application Ser. Nos. 795,211 and 898,178 are expressly incorporated here by reference.

The essential elements of the basic, individual, annular processing passage described in those applications comprise a rotatable element carrying at least one annular processing channel and a stationary element providing a coaxial surface cooperative with the channel to form an enclosed processing passage. The stationary element has an inlet to feed material to the passage for processing and an outlet spaced apart from the inlet a major portion of the circumferential distance about the processing passage to discharge processed material from the passage. A member providing a liquid material collecting end wall surface is arranged with the stationary element and located in the passage near the outlet to obstruct or restrain movement of material fed to the passage and to coact with the rotating channel walls to provide relative movement between the material and the internal surfaces of the channel walls rotated toward the outlet. This distinctive coaction permits only liquid material in contact with the internal surfaces of the rotating channel to be dragged forward to the liquid material collecting end wall surface for controlled processing and/or discharge.

In the preferred embodiment of the invention described in application Ser. Nos. 795,211 and 898,178, the essential elements of the processing apparatus are arranged so that the rotatable channel carrying element is adapted for rotation in a stationary housing or chamber (the stationary element). The described processing channel and preferably a plurality of processing channels are formed in the cylindrical surface of a rotor with each channel having opposing side walls extending inwardly from the rotor surface. The stationary housing or chamber described has an internal, cylindrical surface providing the cooperative coaxial surface which together with the annular processing channel(s) form an enclosed processing passage(s).

The method and apparatus of the Tadmor Applications are described as useful for conveying of solids, melting or plasticating plastic or polymeric material; conveying, pumping or pressurizing viscous liquid material; mixing, blending, dispersing and homogenizing material; and devolatilizing and/or bringing about molecular or microscopic or macroscopic structural changes by chemical reactions such as polymerization.

Because of the versatility and adaptability of the basic individual processing passage, a plurality of them are generally employed to provide processors usually with one or more passages performing a different operation or function. For example, one or more of the individual passages could be assigned the function of receiving and transporting material from one passage to another or, one or more individual passages could be assigned the function of melting or mixing or devolatilizing or discharging polymeric or plastomeric material(s). The particular function assigned an individual passage usually determines the pressure characteristics of that passage. For example, some assigned functions such as melting or discharging can imply the generation of very high pressures. Other functions such as devolatilizing can involve the generation of low pressures while mixing operations may involve moderate pressures. Also, the distribution of pressure along the circumference of each passage can vary depending upon the function or operation assigned the passage. For some functions, pressure may increase linearly along the complete circumference or along only a portion of the circumference or, some functions provide pressure characteristics involving one or more pressure rises followed by one or more sharp drops along the circumference. Moreover, oftentimes basic, individual processing passages having particular pressure characteristics—such as high pressure—are positioned or arranged beside or between units having completely different pressure characteristics—such as low pressure.

In most instances it is desirable to provide effective sealing for some or all of the individual basic passages of a multi-passage processor to prevent unwanted leakage of material from at least some of the passages. The unwanted leakage for example can be external leakage from one or both of the end passages of a multi-passage processor. Also, unwanted leakage can occur internally between adjacent individual processing passages. In all instances however, the leakage of particular concern occurs at a clearance required between the peripheral or top surface of the rotatable cylindrical channel wall(s) and the stationary interior coaxial annular surface particularly at those portions of the passage where high pressures are generated.

External and internal leakage problems are particularly complicated in multi-unit rotary processors because of the differential radial pressures usually established along the circumference of the passage(s). For example, generally the pressure at the inlet of a passage is low while the pressure at the member providing the material collecting end wall surface can be extremely high. In fact, the differential in radial pressures can be great enough to cause deflection of the rotor or shaft thereby imposing an undesirable constraint on the tolerances available for the requisite clearance between the top surface of the rotatable cylindrical channel wall(s) and the stationary interior coaxial annular surface. This deflection problem is described in detail together with a manner for adjusting or compensating for it in U.S. patent application Ser. No. 935,257 filed Aug. 21, 1978 by Zehev Tadmor and Peter Hold, two of the inventors of this Application. The rotor or shaft deflection problem and its effect on clearances between the top surfaces of the rotatable channel wall(s) and the stationary interior coaxial annular surface is also described in detail in U.S. patent application Ser. No. 935,782 filed Aug. 22, 1978 also by Zehev Tadmor and Peter Hold. In that Application, sealing means comprising nested truncated conical members of thin stiffly resilient material are provided for rotary processors. U.S. patent application Ser. Nos. 935,257 and 935,782 are expressly incorporated here by reference.

The present invention is also addressed to the leakage problem in rotary processors and presents to the art improved, novel rotary processors having sealing means which can effectively minimize or prevent leakage at high or low pressures between substantially coaxial surfaces which move relative to each other.

BRIEF SUMMARY OF THE INVENTION

The present invention presents to the art a novel, low friction seal which can control unwanted leakage of material between relatively movable, coaxial surfaces. The novel sealing means of this invention are particularly adaptable to control leakage of liquid between the relatively narrow peripheral portion adjacent a rotatable channel in a rotor and the stationary coaxial annular interior surface closing the channel and in which the clearance between the surfaces permits entry of a thin film of liquid material.

According to this invention, leakage of that thin film of liquid is controlled by providing two, preferably annular channels formed in portions of the two opposed surfaces defining the clearance. The first of these channels is a leakage liquid retaining channel which is formed in the interior surface adjacent the passage and positioned at the clearance. The second channel is a leakage liquid pumping channel which is also positioned at the clearance and is formed in the rotor surface adjacent a rotatable channel wall. The retaining channel and the pumping channel are arranged to operationally communicate with each other so that at least the major portion of liquid leaked through the clearance will be pumped or urged into the retaining channel by the pumping channel. The cross-sectional area of the retaining channel is sufficient to retain at least all of the liquid material leaked through the narrow clearance and pumped or urged into the retaining channel by the pumping channel during each complete revolution of the processing channel wall(s). Additional elements of the novel leakage liquid control means of this invention include a member arranged at a fixed position extending into the retaining channel to restrain movement of the liquid pumped into the retaining channel to provide a leakage liquid collecting position. In accordance with the invention, ports are provided to conduct the leakage liquid from the collecting position to a region of lower pressure. The region of lower pressure may be a position which is internal to the rotary processor or a position external to it.

The invention therefore provides novel, improved leakage control means which can effectively control external leakage of liquid from end passages of the processor or internal leakage of liquid from one passage to another.

DESCRIPTION OF THE DRAWINGS

FIG. 1 is a side elevation of a multi-unit rotary processor in which the invention is embodied and of the type described in U.S. patent application Ser. No. 795,211, with parts broken away to show a rotor, channel and coaxial surface providing individual basic processing units.

FIG. 2 is a sectional view on an enlarged scale of a portion of the processor shown in FIG. 1 showing an arrangement of elements providing a liquid leakage control means of this invention.

FIG. 3 is a section on line 3—3 of FIG. 2.

FIG. 4 is a section on line 4—4 of FIG. 2 and developed into a plane.

FIG. 5 is a section on line 5—5 of FIG. 2 and developed into a plane.

FIG. 6 is a schematic representation of the pressure profile developed along the circumference of a typical basic processing unit of a multi-unit rotary processor of FIG. 1.

FIGS. 10-16 are views similar to FIG. 2 showing alternative embodiments of the invention.

DESCRIPTION OF THE PREFERRED EMBODIMENT

Figure 7:
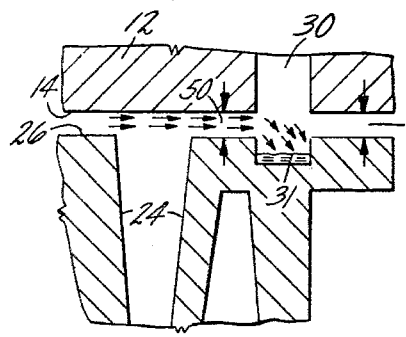
FIGS. 7, 8 and 9 are sectional views generally similar to FIG. 2 but taken at different locations around the processor showing movement of leakage liquid with respect to the leakage control means of this invention.

The invention will be described in relation to its use in a multi-passage rotary processor apparatus such as shown in referenced application Ser. Nos. 795,211 and 898,178. It should be understood however, that the dynamic seals described are useful in other applications where a seal is needed between surfaces rotating relative to each other.

As described in greater detail in application Ser. Nos. 795,211 and 898,178 rotary processor apparatus (see FIG. 1) includes a rotatable element comprising a rotor 10 which is mounted for rotation in housing 12 having a cylindrical interior surface 14, the rotor being supported on drive shaft 16 journalled in end walls (not shown) of housing 12. Rotor 10 has a plurality of channels 20, each including opposed side walls 24 in fixed relation to each other, and top surface portions 26, coaxial with, and in close, spaced relation to, stationary interior surface 14 of housing 12 on each side of channel 20. Rotatable channel 20 and stationary interior surface 14 of the housing 12 form a basic processing passage into which material is introduced for processing through an inlet opening 28. Movement of the channel drags material in contact with the channel walls 24 to a member providing a material collecting end wall surface (not shown). Collected processed material is discharged through outlet opening 29 in housing 12. Pressure is generated by dragging of material on channel walls 24 toward the material collecting end wall surface so that the channel becomes a region of high pressure increasing in the direction of rotation.

As shown in FIG. 1, there is a close clearance 50 between top surface(s) and 26 stationary interior surface 14 of housing 12. Ideally, clearance 50 should be about 10 miles or less and preferably between about 3-5 mils. Generally, clearance 50 should be substantially constant about the circumference of the passage. However, as described in referenced U.S. patent application Ser. Nos. 935,257 and 935,782 mentioned before, maintenance of such a close, constant clearance can be complicated by the differential radial pressures generated along the circumference of the channel. This imbalance of radial pressures may be sufficient to cause shaft or rotor deflection from a high pressure region toward a low pressure region. Obviously, any deflection can affect the maintenance of the desired close, constant clearance because additional clearance must be provided to compensate for the extent of any deflection. In U.S. application Ser. No. 935,257 deflection is controlled by disposing flow director units in radially opposing relation so that the radial pressures generated in one part of a processing passage or group of processing passages are balanced by radial pressures generated in another part. While shaft deflection control can reduce leakage it is oftentimes desirable to provide auxiliary or additional sealing means to minimize leakage to the greatest extent possible.

Leakage control means of this invention is particularly adapted to control external leakage and is shown in FIGS. 2-5 where annular leakage liquid retaining channel 30 is shown formed in the interior surface 14 at clearance 50. Retaining channel 30 is arranged to operationally communicate with leakage liquid pumping channel 31 formed in rotatable surface 26 of rotor 10 at clearance 50 adjacent a processing channel wall 24. Retaining channel 30 has an internal cross-sectional area sufficient to collect and retain at least substantially all of the liquid material leaking from processing channel 20 into gap 50 during a complete revolution of processing channel wall(s) 24. A stationary member 32 extends into and preferably tightly fits the retaining channel 30 so that surface 35 of member 32 prevents or restrains further movement of the liquid being pumped into channel 30 during each complete revolution. In a preferred embodiment of this invention (FIGS. 2-5) member 32 also extends into pumping channel 31 to restrain movement of fluid in channel 31 and force or discharge the fluid from channel 31 into channel 30 during a complete revolution of the processing channel. Surface 35 of member 32 accordingly provides and defines a leakage liquid collection position for liquid pumped into retaining channel 30 and liquid leaking into pumping channel 31 during a complete revolution of the processing channel.

As shown graphically in FIG. 6, during each revolution of the processing channels 20, the pressure in the inlet region of the channels is relatively low. However, the pressure gradually increases about the circumference of channels 20 and reaches a maximum value usually at or near the material collecting end wall surface of processing channels 20 all as completely described in the copending applications mentioned before. Substantially the same pressure profile is achieved in the leakage control means of this invention with maximum pressure being reached at or near the liquid collecting position adjacent surface 35 of member 32. Accordingly, member 32 should be positioned to extend into retaining channel 30 and/or pumping channel 31 at a circumferential region or position along channels 30 and 31 where the pressure is relatively high but also adjacent to low pressure circumferential region or position along the passage. A port 33 extends from the liquid collecting position at surface 35 to a region of lower pressure for discharge of liquid collected at the collecting position. For example, as shown in FIGS. 2, 3 and 4, port 33 may preferably provide for discharge of collected liquid to the location of inlet 28 at the low pressure region of processing channel 20.

Figure 8:
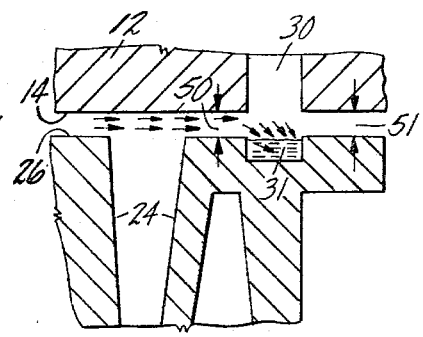
Figure 9:
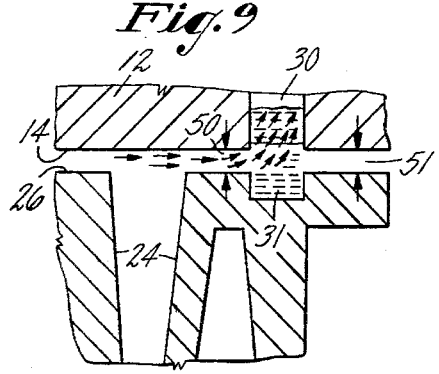

The operation of the novel leakage liquid control means will be better appreciated by reference to FIG. 6 taken in connection with FIGS. 7, 8 and 9. FIG. 7 depicts a leakage liquid situation which can exist at a portion of a rotating processing passage at about point A of FIG. 6 near an area of low pressure. As pressure begins to increase in processing channel 24 at point A, some liquid (shown by the arrows) leaks into clearance 50 and moves toward exit clearance 51. However, the major portion of the liquid moved through clearance 50 will preferentially fill pumping channel 31 and/or retaining channel 30 rather than move toward end exit clearance 51.

FIG. 8 depicts a leakage liquid situation which can exist at a portion of higher pressure in the rotating processing channel at about point B of FIG. 6. More leakage liquid is forced into clearance 50 because of the increase of pressure between points A and B. As shown, enough leakage liquid has moved into clearance 50 to completely fill pumping channel 31. Pumping channel 31 therefore collects or receives the leakage liquid into clearance 50 and provides a drag flow for additional liquid moved into clearance 50 so that additional leakage liquid is dragged along in the direction of rotation of pumping channel 31 rather than moved toward end exit clearance 51.

FIG. 9 depicts a leakage liquid situation which can exist at a portion of a rotating processing channel at about point C of FIG. 6. As shown, more leakage liquid has moved into clearance 50. Because the drag flow generated by pumping channel 31 is greater than the leaking pressure flow into clearance 50, leakage liquid is pumped into retaining channel 30. So long as the drag flow exceeds the leaking liquid pressure flow, minimal leakage of fluid through exit clearance 51 will occur. Instead, the major portion of liquid leaking into clearance 50 will be pumped into retaining channel 30 by pumping channel 31 and will continue to be accumulated in channel 30 until discharged at the collecting position at surface 35 (FIGS. 3 and 4).

Figure 10:
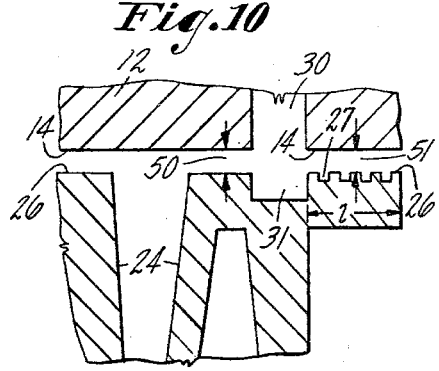

The embodiment of the invention shown in FIG. 2 is particularly adapted to provide means to control external leakage from end passages of rotary processors. However, some external leakage of liquid may occur through clearance 51 which need not be the same as clearance 50 but can be less so that leakage through clearance 51 is minimized by maintaining clearance 51 as close as possible e.g., 5 mils or less. Leakage through clearance 51 however can also be controlled by providing pumping channel 31 and retaining channel 30 at clearance 51. Alternatively, leakage through clearance 51 can be minimized or effectively controlled by combining or integrating the leakage liquid control means of this invention with the dynamic sealing means disclosed in U.S. application Ser. No. 965,388 entitled "Improved Seals For Rotary Processors" and filed concurrently with this Application by Zehev Tadmor and Peter Hold and incorporated here by reference. As described there, an effective dynamic seal can be established between the surfaces defining clearance 51 by providing one of the surfaces 14 or 26 with a plurality of oblique sealing channels. FIG. 10 illustrates this embodiment of the invention where surface 26 of clearance 51 is provided with a plurality of oblique sealing channels 27 to establish a dynamic seal between surface 26 and surface 14.

Figure 11:
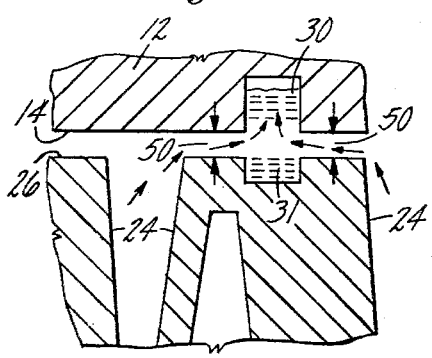
Figure 12:
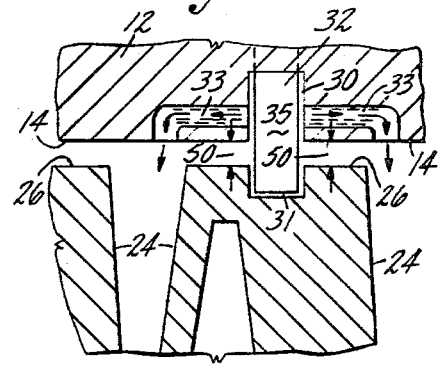

Other preferred embodiments of this invention are shown in FIGS. 11 through 16. FIG. 11 illustrates a leakage liquid situation which can exist at a point along the circumference of the rotor between adjacent channels 20 approaching but not yet reaching the material collecting end wall surface providing member positioned in each adjacent channel. For example, the situation illustrated in FIG. 11 could exist at a point between points B and C of FIG. 6. As adjacent channels 20 rotate toward their respective material collecting end wall surfaces, increased pressure builds up along the circumference of adjacent channels forcing leakage liquid into clearance 50 (see arrows). However, the drag force created by the surface of the liquid in rotating pumping channel 31 causes the leakage liquid moving from the adjacent channels to be accumulated in leakage liquid retaining channel 30. Accumulation in retaining channel 30 continues until the accumulated leakage liquid is carried to member 32 at collecting surface 35. FIG. 12 illustrates the situation which occurs when accumulated leakage liquid in retaining channel 30 is carried forward to the material collection position provided by surface 35. As mentioned, member 32 is preferably positioned along the circumference of the processing passage where the pressure is relatively high but close to a lower pressure region of the passage. For example, member 32 is preferably positioned so that it extends into retaining channel 30 (and preferably also into pumping channel 31) at a point along the passage at or before the discharge side of the material collecting end wall surface; (s) of channel (s) 20. Under such circumstances, leakage liquid collected at or near surface 35 is discharged from channel 30 through ports 33 which connect the collection position to one or more regions having a pressure lower than that at the collection position. That region of lower pressure can be located internally or externally of the rotary processor. Preferably, the accumulated leakage liquid is discharged to a low pressure region of a passage such as adjacent the inlet, for recirculation in the passage. However, the accumulated leakage liquid could alternatively be discharged through a port connecting the collection position to a low pressure region located outside the processor for external collection and disposal if desired.

The embodiment of the invention shown in FIGS. 11 and 12 is particularly adaptable for controlling leakage liquid between adjacent processing channels performing the same processing operation and/or having substantially the same configuration and arrangement of elements such as having the same arrangement of their respective processing channel blocks. However, oftentimes multi-unit processors can involve or include adjacent processing channels which perform different operations and/or have different configurations and different arrangements of elements which provide different pressure characteristics. For example, adjacent channels can be arranged so that extremely high pressures may be generated along a portion of one channel while relatively low pressures are generated in an adjacent passage.

FIGS. 13 and 14 illustrate a liquid leakage situation which can exist between two adjacent passages having substantially different pressure characteristics. FIG. 13 illustrates a situation which can exist at a point along the circumference of adjacent passages where one of the adjacent channels 20 is approaching but has not reached the point of maximum pressure while only relatively low pressures are generated in the other adjacent channel 20 at this point. As shown in FIG. 13, leakage liquid (see arrows) is moved into clearance toward the low pressure channel 20 as pressure in adjacent channel 20 increases. However, the drag flow established by rotating pumping channel 31 causes liquid leakage moved into clearance 50 to be dragged in the direction of rotation of pumping channel 31 and the liquid leakage is accumulated in liquid leakage retaining channel 30. So long as the drag flow generated by pumping channel 31 exceeds the pressure flow moving leakage liquid into clearance 50, accumulation of leakage liquid retaining channel 30 will continue.

FIG. 14 illustrates the situation which occurs when accumulated leakage liquid is carried to a collection position located at or near surface 35 of channel block 32. Again, because channel block 32 is positioned along the circumference of the passage where pressure is relatively high, leakage liquid collected at the collection position is discharged through port 33 to the inlet region of the same or an adjacent channel 20 for recycling.

As mentioned, preferred leakage liquid control means of this invention are those in which channel block 32 extends into pumping channel 31 as shown in FIGS. 2, 3, 12 and 14. This feature provides mixing of leakage liquid collected in pumping channel 31 with accumulated leakage liquid at the liquid collecting position thereby minimizing stagnation and/or degredation of leakage liquid in the area of the leakage control means of this invention.

As mentioned, the preferred rotary processors of this invention are multi-unit rotary processors comprising at least one but preferably a plurality of the leakage liquid control means of this invention to prevent unwanted external leakage of liquid from one or more end units of the processor or to prevent unwanted internal leakage of liquid between channels. Accordingly, preferred multi-unit rotary processors of this invention are those having the leakage liquid control means of this invention integrated with multi-unit rotary processors having the features described in copending application Ser. No. 935,257 which has been incorporated here by reference. Essentially, the multi-unit processors of that application are those in which the rotor carrying the processing channels has cylindrical portions between the processing channels which are in close sliding engagement with the housing of the rotor so that passages formed in the housing and extending between processing channels are completed by the cylindrical surfaces of the rotor to form transfer passages between the annular processing channels.

In a preferred form, these transfer passages are provided by removable flow director units which are held by the processor housing and include surface portions forming part of the surface of the housing and with the transfer passages formed in these surface portions of the flow director units. The flow director units may also carry the channel end blocks which extend into the processing channels of the rotor. In a further form, transfer passages and end blocks are circumferentially and/or axially disposed to reduce bearing load to develop opposed radial forces in the processing channels. For example, the channel blocking members and transfer passages may be arranged to develop radial forces in at least one of the channels to oppose radial forces developed in at least one other channel to provide substantial axial balance of radial forces. Axial balance of radial forces is desirable because shaft or rotor deflection is minimized thereby providing closer and better control over clearances between the surfaces carrying the leakage liquid retaining and pumping channels of this invention.

The leakage liquid control means of this invention are particularly effective for controlling leakage liquid between surfaces spaced apart from each other by clearances (50) of about 10 mils or less, and especially effective if the surfaces carrying the liquid leakage retaining and pumping channels are spaced apart from each other by clearances of about 5 mils or less. However, leakage liquid control means of this invention can also be employed in combination with other sealing means to provide effective control of leakage liquid between annular coaxial surface spaced apart from each other by a clearance (50) for example which is greater than about 10 mils.

FIG. 10 which has already been discussed, illustrates an arrangement of elements in which a leakage control means of this invention is combined with dynamic sealing means. The dynamic sealing means is described in detail in copending application Ser. No. 965,388 entitled "Improved Seals For Rotary Processors" filed by Peter Hold and Zehev Tadmor concurrently with this Application and has already been incorporated here by reference. FIG. 15 illustrates another arrangement of elements providing sealing between coaxial relatively moving surfaces by a combination of a leakage liquid control means of this invention with dynamic sealing means. As disclosed in the copending application mentioned above, (Ser. No. 965,388) the dynamic sealing means comprises a plurality of oblique sealing channels carried on one of the two annular, coaxial surfaces at or near narrow clearance 50. Essentially, the width ($?$) (FIG. 15) of the surface carrying the oblique sealing channels, the number, angle and geometry of the channels is selected so that leakage liquid which penetrates the channels at one side of the surface carrying the sealing channel will not reach the other side of the channel carrying surface. Some rotary processors have design requirements such as larger clearances e.g. greater than about 10 mils or relatively narrow widths of surfaces 26 so that not enough oblique sealing channels can be provided on the sealing channel carrying surface to completely control leakage of liquid through the clearance. These and other design features can limit the number of oblique sealing channels provided on the sealing channel surface ($?$) so that the amount of liquid entering the sealing channels at one side of the sealing channel carrying surface can reach the other side of the channel carrying surface. As shown in FIG. 15, liquid penetrating oblique sealing channels 27 beyond width ($?$) will be collected in leakage liquid pumping channel 31 and pumped into leakage liquid retaining channel 30 for accumulation and discharge in the manner described before.

FIG. 16 shows an alternative embodiment of the invention shown in FIG. 15 where the plurality of oblique sealing channels 27 is carried on stationary coaxial surface 14. This modification could also be applied to the invention illustrated in FIG. 10 by providing the plurality of oblique sealing channels on stationary coaxial surface 14 rather than on rotatable coaxial surface 26 of FIG. 10.

From the above description it should be apparent that the present invention presents to the art novel means for controlling leakage of liquid between two relatively rotatable, coaxial, closely spaced apart surfaces. The leakage control means of this invention is particularly adaptable to rotary processors for processing liquid and/or solid polymeric materials in a more efficient fashion providing a low friction positive seal for controlling external or internal leakage of liquid with minimal power loss at the seal. Accordingly, this invention presents to the art new and useful apparatus providing particularly desirable and unexpectedly improved overall performance characteristics over apparatus known to the art at the time this invention was made.

We claim:

1. Apparatus comprising sealing means for controlling leakage of liquid through a clearance between two coaxial surfaces, one of said surfaces being stationary and the other rotatable, said sealing means comprising an annular liquid retaining channel in said stationary surface at said clearance and operationally communicating with an annular liquid pumping channel in said rotatable surface at said clearance so that liquid leaking into said clearance is urged into said retaining channel by drag flow established by relative motion between said pumping channel and said retaining channel, said retaining channel being large enough to receive at least substantially all leakage liquid urged into it during each revolution of said rotatable pumping channel; and, a member extending into said retaining channel to restrain movement of at least a substantial portion of leakage liquid in said retaining channel to thereby collect at least said portion of leakage liquid in said retaining channel at a collection position, and port means for conducting said leakage liquid from said collection position.

2. Apparatus comprising sealing means for controlling leakage of liquid through a clearance between two coaxial surfaces, one of said surfaces being stationary and the other rotatable, said sealing means comprising an annular liquid retaining channel in said stationary surface at said clearance and operationally communicating with an annular liquid pumping channel in said rotatable surface at said clearance so that liquid leaking into said clearance is urged into said retaining channel by drag flow established by relative motion between said pumping channel and said retaining channel, said retaining channel being large enough to receive at least substantially all leakage liquid urged into it during each revolution of said rotatable pumping channel; and, a member extending into said retaining channel to restrain movement of at least a substantial portion of leakage liquid in said retaining channel to thereby collect at least said portion of leakage liquid in said retaining channel at a collection position, and port means for conducting said leakage liquid from said collection position.

3. Apparatus of claims 1 or 2 where the rotatable and stationary surfaces each have opposed surface portions extending in at least one direction from said pumping channel and from said retaining channel and one of the opposed surfaces has a plurality of oblique sealing channels arranged so that leakage liquid moved into said clearance can penetrate said oblique sealing channels, the width of the sealing channel carrying surface, the number, angle and geometry of said channels being selected so that the force causing penetration of said clearance and said channels by leakage liquid is opposed by a force applied to the liquid in the sealing channels as the surfaces are relatively rotated to thereby resist the extent of penetration of leakage liquid in any of said sealing channels.

4. Apparatus of claims 1 or 2 where said narrow clearance is about 10 mils or less.

5. Apparatus of claims 1 or 2 where said narrow clearance is about 5 mils or less.

6. Apparatus of claims 1 or 2 where said port means includes two ports connecting said collection position to two different regions of lower pressure.

7. Apparatus of claims 1, or 2 where said rotatable surface is a surface of a rotatable rotor carrying at least one coaxial annular processing channel having opposed processing channel side walls and a stationary surface coaxial with and spaced apart from peripheral surfaces of the rotatable channel side walls so that the stationary surface together with the processing channel provide an enclosed processing passage, an inlet for feeding material into said processing channel, an outlet circumferentially spaced apart from said inlet for discharge of material from said processing channel and a member positioned in said processing channel to cause relative motion between opposed walls of said processing channel and material fed to said processing channel.

8. Apparatus for processing materials which comprises:

a rotatable element having a surface carrying at least one processing channel;

a stationary element providing a coaxial surface spaced apart from said surface of the rotatable element by a close clearance and cooperatively arranged with the processing channel to form an enclosed annular processing passage with the processing channel; said stationary element also having associated with it an inlet for feeding the particulate material to the passage, an outlet spaced apart from the inlet by a major portion of the circumferential distance about the passage for discharging material from the passage and a member located in the channel providing a surface for restraining movement of the main body of particulate material in the passage and, means to rotate said rotatable element in a direction from the inlet toward the material restraining surface so that the rotatable element and the restraining surface providing member coact to establish relative movement between the restrained material in the passage and rotating inner wall surfaces of the processing channel sufficient to prevent any substantial movement of the main body of material in the passage but permitting the rotating inner surfaces to drag only liquid portions of the material in contact with the inner surfaces forward for discharge and pressure is built up along the length of travel of the side wall towards the restraining surface and, means for controlling leakage of liquid through said clearance, said leakage control means comprising a leakage liquid retaining channel carried about the circumference of a portion of said coaxial surface at said clearance, said leakage liquid retaining channel operationally communicating with a leakage liquid pumping channel carried in a peripheral surface of the rotor adjacent at least one of said processing channel side walls at said clearance so that leakage liquid moved into said clearance is urged into said retaining channel by drag flow established by relative motion between said pumping channel and said retaining channel, said retaining channel being large enough to receive and retain at least substantially all leakage liquid urged into it during each revolution of said rotor; a blocking member extending into said retaining channel to restrain movement of at least a substantial portion of leakage liquid in said retaining channel to thereby collect at least said portion of leakage liquid in said retaining channel at a collection position and, port means for conducting said leakage liquid from said collection position to a region of pressure lower than the pressure at said collection position.

9. Apparatus for processing materials which comprises:

a rotatable element having a surface carrying at least one processing channel;

a stationary element providing a coaxial surface spaced apart from said surface of the rotatable element by a close clearance and cooperatively arranged with the processing channel to form an enclosed annular processing passage with the processing channel; said stationary element also having associated with it an inlet for feeding the particulate material to the passage, an outlet spaced apart from the inlet by a major portion of the circumferential distance about the passage for discharging material from the passage and a member located in the channel providing a surface for restraining movement of the main body of particulate material in the passage and, means to rotate said rotatable element in a direction from the inlet toward the material restraining surface so that the rotatable element and the restraining surface providing member coact to establish relative movement between the restrained material in the passage and rotating inner wall surfaces of the processing channel sufficient to prevent any substantial movement of the main body of material in the passage but permitting the rotating inner surfaces to drag only liquid portions of the material in contact with the inner surfaces forward for discharge and pressure is built up along the length of travel of the side walls towards the restraining surface and, means for controlling leakage of liquid through said clearance, said leakage control means comprising a leakage liquid retaining channel carried about the circumference of a portion of said coaxial surface at said clearance said leakage liquid retaining channel operationally communicating with a leakage liquid pumping channel carried in a peripheral surface of the rotor adjacent at least one of said processing channel side walls at said clearance so that leakage liquid moved into said clearance is urged into said retaining channel by drag flow established by relative motion between said pumping channel and said retaining channel, said retaining channel being large enough to receive and retain at least substantially all leakage liquid urged into it during each revolution of said rotor; a blocking member extending into a major portion of said pumping channel to restrain movement of at least a substantial portion of leakage liquid in the retaining channel and pumping channel to thereby collect substantially all of the leakage liquid in both said retaining channel and said pumping channel at a collection position and, port means for conducting said leakage liquid from said collection position to a region of pressure lower than the pressure at said collection position.

10. Apparatus of claims 8 or 9 where at least one of the rotor surfaces carrying said pumping channel or the surface carrying said retaining channel each have opposed surface portions extending in at least one direction from said pumping channel or from said retaining channel and one of the opposed surfaces have a plurality of oblique sealing channels arranged on said surface portion so that leakage liquid moved into said narrow clearance can penetrate said oblique sealing channels, the width of the sealing channel carrying surface, the number, angle and geometry of said channels being selected so that the force causing penetration of said clearance and said channels by leakage liquid is opposed by a force applied to the liquid in the sealing channels as the surfaces are relatively rotated to thereby resist the extent of penetration of leakage liquid in any of said sealing channels.

11. Apparatus of claims 8 or 9 where said clearance is about 10 mils or less.

12. Apparatus of claims 8 or 9 where said clearance is about 5 mils or less.

13. Apparatus of claims 8 or 9 where said port means includes two ports connecting said leakage liquid position to two different regions of lower pressure.

14. Apparatus of claims 8 or 9 where said port means connects said leakage liquid collection position to an inlet of said passage.

15. Apparatus of claims 8 or 9 where said port means comprises two ports connecting said liquid collection position to the inlets of two passages.

* * * * *